United States Patent [19]
Walters et al.

[11] Patent Number: 4,597,455
[45] Date of Patent: Jul. 1, 1986

[54] ROCK BIT LUBRICATION SYSTEM

[75] Inventors: D. F. Walters, Midlothian; David T. Brunson, Arlington; William R. Bell, Dallas, all of Tex.

[73] Assignee: Dresser Industries, Inc., Dallas, Tex.

[21] Appl. No.: 719,613

[22] Filed: Apr. 3, 1985

[51] Int. Cl.[4] ............................................. E21B 10/22
[52] U.S. Cl. .................................. 175/228; 175/372; 384/93
[58] Field of Search .................. 175/227–229, 175/337, 339, 340, 358, 359, 371, 372; 384/93

[56] References Cited

U.S. PATENT DOCUMENTS

| | | | |
|---|---|---|---|
| 2,814,465 | 11/1957 | Green | 384/93 |
| 3,230,020 | 1/1966 | Gilbert et al. | 175/228 |
| 3,251,634 | 5/1966 | Dareing | 175/228 |
| 3,307,645 | 3/1967 | Hildebrandt | 175/372 |
| 3,845,994 | 11/1974 | Trey | 384/93 |
| 3,923,348 | 12/1975 | Peck | 175/372 X |
| 4,199,856 | 4/1980 | Farrow et al. | 175/228 X |

*Primary Examiner*—Stephen J. Novosad
*Assistant Examiner*—Thuy M. Bui
*Attorney, Agent, or Firm*—Fred A. Winans

[57] ABSTRACT

A sealed, pressure-equalizing lubrication system for a rotary rock bit is shown. The system includes a lubricant-filled container having an outlet and a portion of the container includes a flexible diaphragm. The container is mounted in a chamber in the journal axle portion of the bit, immediately adjacent and open to the sealed bearing cavity of the bit cutter, with the outlet disposed adjacent the cavity. A bleed hole is provided from the back face of the bit to the chamber adjacent the diaphragm causing the diaphragm to be responsive to the pressure of the external downhole fluid. The adjacency of the reservoir to the sealed bearing cavity permits the pressure of the lubricant adjacent the seal to be immediately responsive to the pressure of the downhole fluid at the diaphragm to prevent pressure differentials between the lubricant and the fluid at the seal.

5 Claims, 4 Drawing Figures

ROCK BIT LUBRICATION SYSTEM

BACKGROUND OF THE INVENTION

1. Field of the Invention

This invention relates to a rotary rock bit having a sealed, pressure-equalization lubrication system, and more particularly, to such bit lubrication system and structure wherein the lubricant reservoir is disposed within the axially extending journal and immediately adjacent the rotary cutter bearing structure to minimize the length of the lubricant flow path, and thereby decrease the reaction time of the pressure equalization between the reservoir and the bearing seal.

2. Description of the Prior Art

Sealed, pressure-equalizing lubrication systems for rotary rock bits are well known as shown, for example, by U.S. Pat. No. 4,199,856 of common assignee with the present invention. The structure shown therein is generally typical of the presently commercially successful rotary rock bits, and it is seen to include a diaphragm-sealed lubricant reservoir disposed in the upper portion of each arm of the bit on which a rotary cutter is mounted. The diaphragm is in fluid communication with the exterior of the bit to be responsive to the external fluid pressure.

A lubricant flow path leads through the arm from the lubricant reservoir to various outlets in or adjacent the journal or pin supporting the bearing structure of the rotary mounted cutter. The back face of the rotary cutter (i.e. the face adjacent the arm) contains an elastomeric seal for sealing the bearing structure from the external environment of the bit.

In operation, the external environment for the bit is typically the abrasive drilling mud and cuttings circulating at high velocity and pressures as the bit is rotated downhole. Under static conditions, the flexible diaphragm of the lubricant reservoir maintains the internal pressure of the lubricant substantially equal to the external pressure so there is essentially no pressure differential across the seal or across the diaphragm. Thus, under such conditions, there is no appreciable tendency for the drilling mud to leak into the bearing and lubrication system, nor for the lubricant to leak out.

However, in practice, it has been found that the dynamics of operation, such as the occasional bouncing of the bit on the bottom of the borehole as it rotates, causes localized pressure surges in the external fluid that develop, although maybe for only relatively short duration, pressure spikes or peaks that may also be rather localized at certain locations on the bit. Because the lubricant filling the reservoir and flow paths is relatively viscous, and the lubricant path between the diaphragm and the elastomeric seal quite long, such pressure surges cannot be immediately pressure compensated within the lubricant system, resulting in, on occasion, substantial pressure differential existing across the seal. These pressure differentials can in turn force the seal to assume a high rubbing or frictional engagement causing rapid, if not immediate failure. Further, depending upon whether the external pressure is relatively high or relatively low with respect to the internal lubricant pressure, the abrasive mud can be forced past the seal into the bearing cavity to attack the bearings and also abrade the rubber face of the seal, or the lubricant can be forced out of the bearing housing, which in time will deplete the finite supply of lubricant contained within the reservoir. Further, the long paths and high viscosity of the lubricant can, on occasion, contribute to insufficient lubricant being forced into the bearings to replace lost or expelled lubricant. Any of the above generally leads to premature failure of the bearing and bit.

SUMMARY OF THE INVENTION

The present invention, while employing a pressure responsive sealed lubricant system, locates the pressure responsive diaphragm and the elastomeric bearing cavity seal in close proximity to each other so as to minimize the length of the lubricant flow path therebetween to minimize the response time for equalizing the pressure during pressure surges. Also, each is exposed to and responsive to generally the same external pressure conditions. To accomplish this, the lubricant reservoir is located in the axially extending journal or axle on which the bearings are mounted. The flexible diaphragm is exposed on one side to the lubricant reservoir and the opposite face is exposed to the drilling mud. The adjacency of the diaphragm with the seal, as through a minimal length lubricant passage, maintains pressure equalization across the seal that is substantially immediately responsive to pressure variations without significant lag, therefore, making the seal more effective and longer lasting. Further, the immediate adjacency of the reservoir to the bearings minimizes the resistance of the viscous lubricant to be forced, by the external pressure, into the bearing cavity, thereby assuring that the bearings remain lubricated during use.

DESCRIPTION OF THE PREFERRED EMBODIMENT

Figure 1:
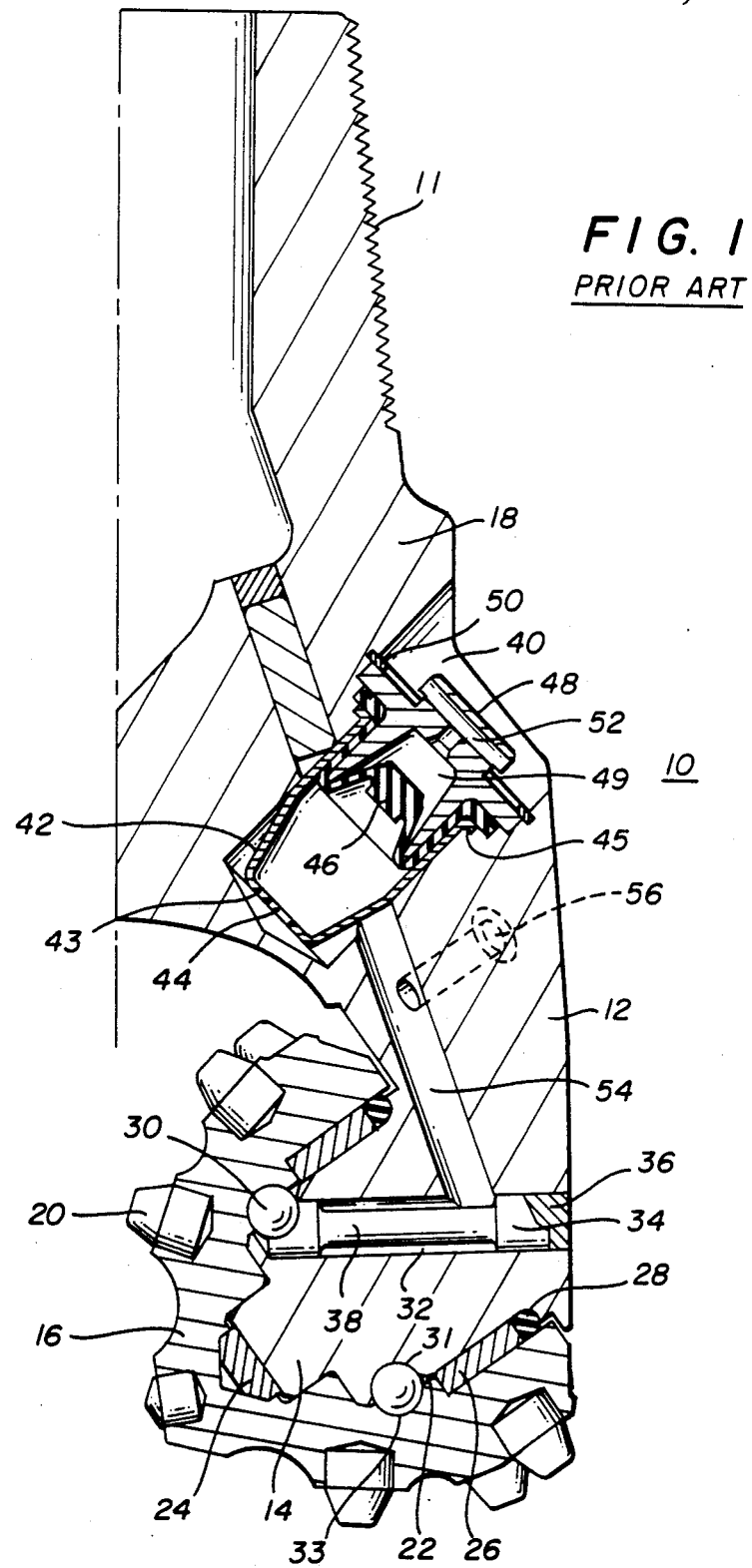
FIG. 1 is an elevation cross-sectional view through one arm of a rotary rock bit, showing typical prior art construction.

Referring to FIG. 1, there is shown a cross-sectional view through one segment of a rotary rock bit having a pressure-compensated sealed lubrication system in accordance with the prior art. It is understood that in a completed rock bit, there are generally three such segments or legs, each having an independent lubrication system for the rotary cutter mounted thereon. As illustrated, the bit 10 includes a bit body having an upper threaded portion 11 for connecting the bit to the lower end of a rotary drill string (not shown). On the end opposite the threaded end is a depending leg 12 terminating in an inwardly downwardly directed axle portion 14 on which the rotary cutter 16 is rotatably mounted. The portion of the bit 10 intermediate the threaded end and the leg 12 provides a thickened dome portion 18.

Cutter 16 is a generally conically shaped structure having tungsten carbide or other cutting structure 20 projecting outwardly from its surface and having an internal cavity 22 configured to be rotationally supported on the axle 14. Thus, as is shown, the internal cavity 22 includes a thrust button 24 for thrust bearing engagement with the axial end of the axle 14, a journal bearing 26 pressed into the cavity for rotational bearing engagement with the axle 14 and an elastomeric O-ring seal 28 at the mouth of the cavity 22 to provide a seal between the cavity 22 and the axle 14 providing a sealed bearing assembly for the cutter as mounted on the axle.

The cutter 16 is retained on the axle 14 by a plurality of balls 30 inserted through a ball passage 32 in the axle to reside in an annular array within cooperatively associated ball races 31, 33 in the axle and cutter respectively in a manner that, once the balls 30 are inserted, prevent the cutter 16 from axial disengagement from the axle 14. The ball passage 32 is subsequently plugged with a ball plug 34 welded at 36 into the ball passage 32, but defining a necked down intermediate portion 38 for reasons to be explained.

A lubricant cavity 40 open to the outside surface of the bit 10 is provided in each dome portion 18 and houses a lubricant reservoir comprising a generally cylindrical lubricant container 42 disposed within the cavity and having a closed end 43 with a lubricant opening 44 therein and the opposite open end having a flanged shoulder 45 supporting thereon a flexible resilient diaphragm member 46 for closing the container. A cap 48 covers the diaphragm 46 and defines a chamber 49 facing the diaphragm to provide a volume into which the diaphragm can expand. The cap 48, diaphragm 46 and container 42 are retained within the cavity 40 by a snap ring 50. The cap 48 also includes an opening 52 for placing the outer face of the diaphragm in communication with the external fluid surrounding the bit. The volume between the diaphragm and the container 42 is filled with a suitable lubricant to define a source of lubricant for the bit bearings.

A lubricant passage 54 is drilled through the bit leg 12 to place the lubricant cavity 40 in communication with the ball plug opening 32 from an end of the cavity 40 generally adjacent the lubricant opening 44 in the container 42. Upon assembly of the bit, the lubricant passage 54, lubricant container 42, cavity 40 and the available space in the ball plug passage are all filled with lubricant through an opening 56 (not shown in detail) in the leg which is subsequently sealed after lubricant filling.

Thus, it is seen that the external fluid pressure is transmitted to the lubricant in the container through the diaphragm to maintain the lubricant therein at a pressure generally equal to the pressure external of the bit. This pressure is ultimately transmitted through the filled lubricant passages 54, 32 and the bearing cavity 22 to the internal face of the seal 28 resulting in the O-ring seal being, for the most part, exposed to an internal pressure from the lubricant generally equal to the external pressure of the drilling fluid. However, because the lubricant is rather viscous, there is inherently a time lag for such equalization of pressures to occur. It is during such time lag that the O-ring seal 28 encounters unbalanced pressure forcing it to move into either a binding or more friction engaging relationship and also, the internal lubricant or the external fluid is forced through the seal interface providing the deleterious effects previously mentioned. Also, the resistance to flow, may on occasion, prevent sufficient lubricant from entering the bearings to maintain them lubricated throughout.

Figure 2:
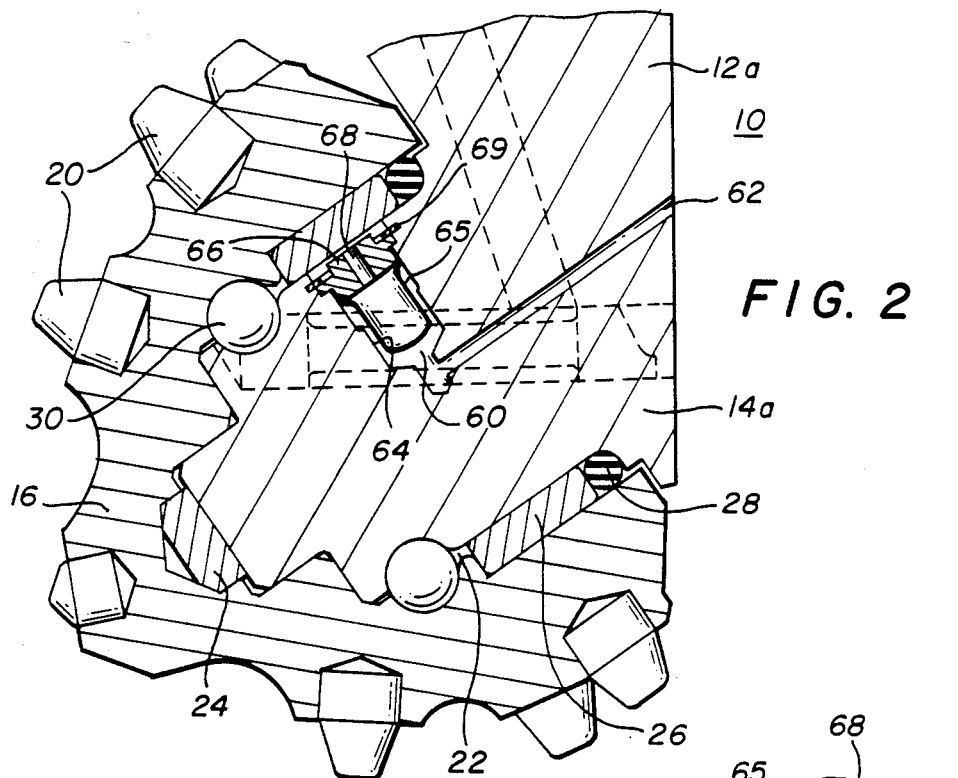
FIG. 2 is a view similar to FIG. 1 showing the rock bit lubrication system of the present invention.

Referring now to FIG. 2, the lubrication system of the present invention is shown and, as therein seen, is contained completely within the lower portion of the leg 12(a). Thus, it is to be understood that the upper portion of the leg which heretofore contained the lubricant reservoir and flow passage as per the prior art of FIG. 1, is generally completely solid and therefore, unnecessary for describing the present invention. In describing FIG. 2, previous reference numerals will be used to define structure common to FIG. 1. Thus, the bit 10, according to the present invention, includes a cutter 16 which, as before, includes a thrust button 24, a journal bearing 26 and an O-ring seal 28 disposed within an internal bearing cavity 22. Also, as before, the bit segment includes an axle or pin portion 14a having a ball passage (not shown in detail) for loading retaining balls 30 therethrough for retaining the cutter 16 on the axle 14a. It is to be understood that other cone retention structures could be utilized such as the snap ring retention shown in U.S. patent (U.S. Ser. No. 568,979), also of common assignee. This is another prior art cone retention structure that can be used with this embodiment of the invention.

During drilling operations, weight is placed on the drill bit such that the lowermost portion of the axle 14(a) becomes the loaded side (as viewed in FIG. 2) and the upper portion thereof becomes an unloaded surface. (This term being employed merely for ease of description as it is understood the entire axle supports the load and is therefor loaded or stressed and, even on occasion, the upper surface can also provide bearing engagement). A lubricant cavity 60 is machined into the axle 14(a) from some portion of the unloaded surface thereof and a bleed hole 62 places the lubricant cavity 60 in communication with the external fluid conditions through the back face of the arm 12a.

An encapsulated lubricant container 64 is disposed within the lubricant cavity 60 in sealing engagement with the side of the cavity 60 and defines a resilient diaphragm bladder 65 having a generally cylindrical shape, closed at one end, and a metal cap 66 received within and closing the opposite end and providing an annular flange 67 for seating engagement with a shoulder area on the cavity 60. The cap 66 includes an opening 68 therethrough for placing the interior of the bladder in fluid communication with the unloaded surface of axle 14(a) and the bearing cavity 22 of cutter 16. A snap ring 69 retains the bladder 65 and cap 66 assembly within the lubricant cavity 60.

Figure 3:
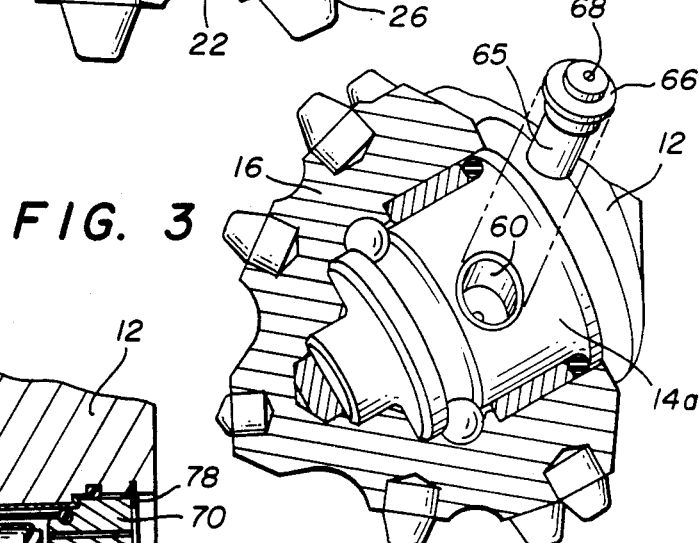
FIG. 3 is an enlarged isometric view of the structure of FIG. 2 showing, in an exploded portion, the diaphragm encapsulated lubricant reservoir.

Referring to FIG. 3, the lubricant bladder 65 and cap 66 assembly is shown just prior to insertion in the lubricant cavity 60 on the unloaded bearing surface of the axle 14(a). The bladder 65 and cap 66 assembly will be initially filled with a suitable lubricant and, prior to assembly, the bearing surfaces of the axle 14(a) and cutter 16 will be provided with smear grease for providing an initial lubrication to such surfaces. The lubricant reservoir (i.e. the bladder and cap assembly), will be retained in position by the snap ring 69 prior to assembly of the cutter 16 on the leg 12.

Thus, it is apparent that, with the lubrication system as above described with reference to FIGS. 2 and 3, the lubricant reservoir formed by the bladder 65 and cap 66 assembly is disposed immediately adjacent and open to the journal bearing area of the bearing cavity 22, which in turn is immediately adjacent the O-ring seal 28. This eliminates the previous lengthy lubricant path between the pressure responsive bladder and the seal, so that, for all practical purposes, there is no lag time between the external pressure variations and an equivalent response in the pressure responsive lubrication system at the internal face of the seal, thereby eliminating pressure differentials across the seal 28, and also, minimizing any tendency from internal or external pressure for the lubricant to escape or the drilling mud to enter the bearing cavity across the sealing engagement provided by the O-ring seal. Further, a relatively lengthy bleed hole 62 is necessary to place the back face of the bladder 65 in pressure responsive relationship with the external fluid pressure; however, this passage or bleed hole is filled with the downhole fluid which is generally immediately responsive to the downhole conditions, much more so than previously transmitting the pressure through the lengthy passage filled with the highly viscous lubricant.

Figure 4:
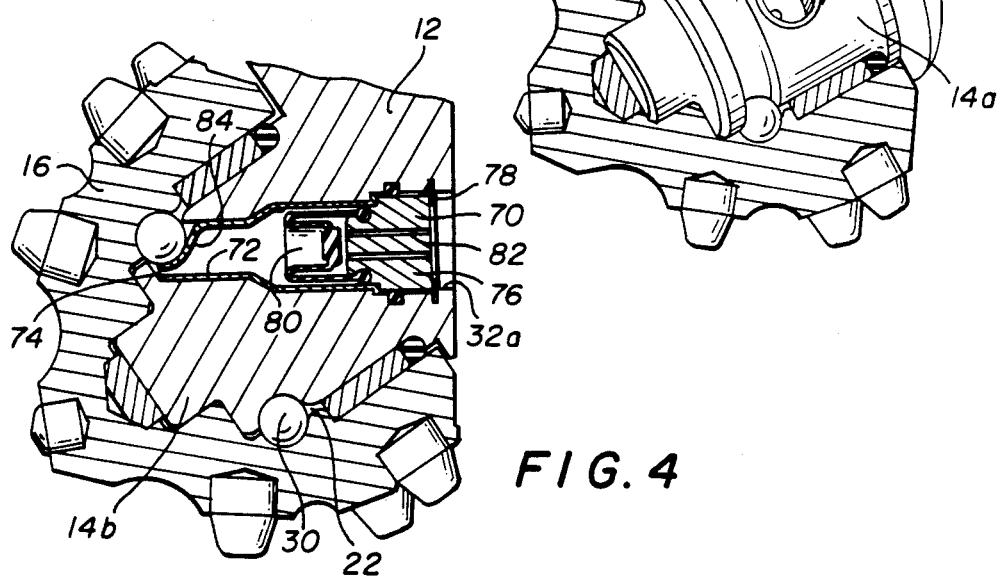
FIG. 4 is an elevation cross-sectional view similar to FIG. 2 of an alternative embodiment of the invention.

An alternative form of the invention is shown in FIG. 4 wherein a ball passage 32(a) formed through the axle portion 14(b) of the leg 12 is filled with a lubricant reservoir assembly 70 comprising a hollow cylindrical member or canister 72, configured at one end 74 to form a portion of the ball race to retain the balls 30 in proper position within the cutter bearing cavity 22, and at the opposite end is closed by a cap or plug 76 in sealed engagement with the ball passage 32 and retained therein such as through a snap ring 78. An elastomeric diaphragm 80 is disposed between the open end of the canister 72 and the plug 76 so that when the open end of the canister fits over a contoured end of the plug, the diaphragm 80 is captured therebetween. The plug 76 has vent holes 82 or bleed holes provided therethrough for placing one side of the diaphragm 80 in fluid flow communication with the back face of the arm. The ball retaining canister has outlets 84 adjacent the contoured end 74, and, prior to being inserted in the ball retaining bore, is filled with a suitable lubricant.

As before, the cutter 16 is assembled on the journal axle 14(b) with smear grease at all the bearing surfaces. The balls 30 are passed through the bore 32(a) to the adjacent races between the cutter 16 and the axle 14(b) for retaining the cutter 16 thereon. The lubricant filled ball plug and reservoir assembly 70, is assembled and secured within the ball retaining borehole 32(a). Again it is noted that the bleed holes 82 through the vent cap or plug 76 permit the flexible diaphragm 80 to be responsive to the external fluid pressures of the drilling fluid, and the opposite face, or lubricant reservoir side, is immediately responsive thereto and, with the reservoir immediately adjacent the bearing cavity, the lubricant pressure on the back face of the seal ring is also responsive thereto within a minimum time lag, equalizing the pressure across the seal.

I claim:

1. An improved rotary rock bit having a pressure compensated sealed lubrication system including:
    a bit body having at least one downwardly extending leg terminating in a projecting axle portion having an inwardly downwardly directed axis;
    cutter means rotatably mounted on said axle portion and defining an internal cavity for receipt therein of said axle portion;
    bearing means disposed within said cavity for rotary load bearing engagement between said axle portion and said cutter;
    seal means disposed between said cutter and said axle portion to seal said cavity and the bearings therein from external ambient fluids said sealed cavity substantially filled with lubricant;
    pressure compensated lubrication means for supplying lubricant from a reservoir to said cavity including a flexible diaphragm member responsive to external fluid pressure to transmit said pressure to said lubricant and wherein the improvement comprises:
    lubricant reservoir means defining a chamber in said axle portion providing a lubricant-containing portion in flow communication with said bearing cavity at one end, said chamber closed at the opposite end by said diaphragm member; and means defining a flow path from a side of said diaphragm opposite said lubricant-containing portion to said external ambient fluids;
    whereby said external fluid pressure is transmitted through said diaphragm member and the lubricant in said chamber and bearing cavity to the back face of said seal and replenish lubricant in said bearing means.

2. Structure according to claim 1 wherein said chamber in said axle portion is open to said bearing cavity on an unloaded side of said axle portion.

3. Structure according to claim 1 wherein said lubricant reservoir means further include a reservoir assembly comprising a lubricant container sized to fit within said chamber, said diaphragm member forming at least a portion of said container and said container having a lubricant distributing port disposed generally adjacent said bearing cavity as assembled in said chamber, and means for retaining said lubricant container in said chamber.

4. Structure according to claim 3 wherein said container is a deformable generally cylindrical member closed at one end and open at the opposite end and further including:
    a generally rigid cap member received within said open end to close said end, said cap defining said lubricant port.

5. Structure according to claim 3 wherein said reservoir assembly comprises:
    a rigid generally cylindrical container open at one end and contoured at the opposite end to form a portion of a roller ball race in the bearing structure of said axle portion, and said lubricant distributing port in said end;
    said diaphragm member engaging and enclosing the open end of said container; and,
    a rigid cap cooperating with said container to generally secure said diaphragm and container and together providing sealed seated engagement with said chamber for mounting said assembly in said chamber.

* * * * *